D. A. LEACH.
Animal Traps.
No. 143,169. Patented September 23, 1873.
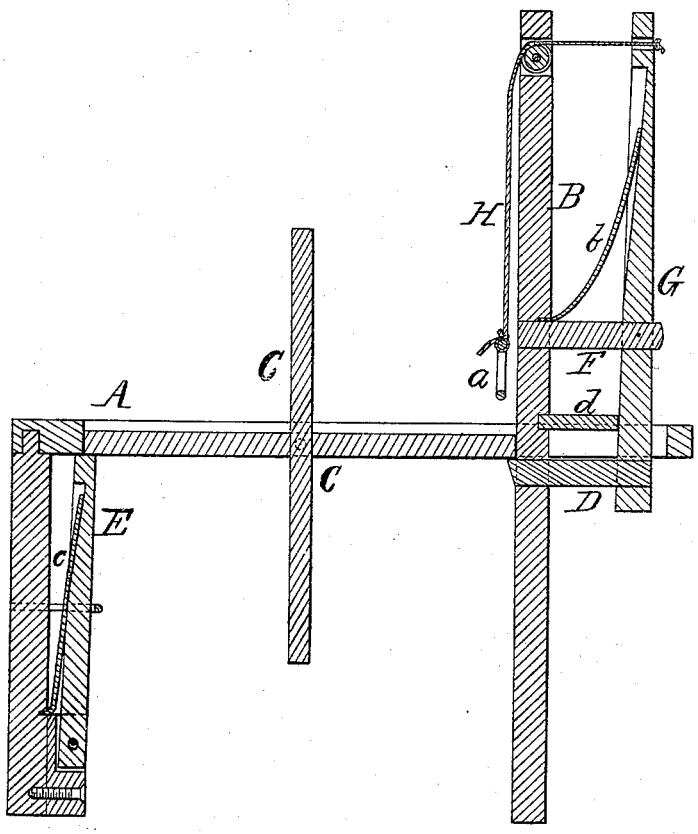
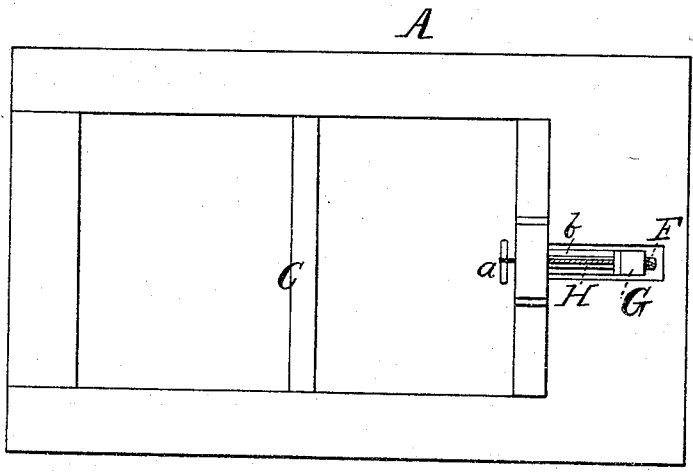
Witnesses.
George E. Upham,
Jos. B. Loomis.
Inventor.
David A Leach
Chipman Hosmer & Co
Atty

UNITED STATES PATENT OFFICE.

DAVID A. LEACH, OF BLOOMINGTON, INDIANA.

IMPROVEMENT IN ANIMAL-TRAPS.

Specification forming part of Letters Patent No. 143,169, dated September 23, 1873; application filed May 24, 1873.

*To all whom it may concern:*

Be it known that I, DAVID A. LEACH, of Bloomington, in the county of Monroe and State of Indiana, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a sectional view of my animal-trap. Fig. 2 is a plan view of the same.

My invention has relation to animal-traps; and it consists in the construction and novel arrangement of revolving platforms and trigger mechanism, whereby an effective trap is formed for use above a cavity in the earth, a barrel, or other receptacle of water or fluid.

Referring to the drawings, the letter A designates the frame of my trap, having the head-board B. C represents a four-winged revolving trap-door, which, when on a balance, is kept in position by the stop-latch D passing through a slot in the head-board just below the frame and the rear latch E. The rear latch E acts as a stop to prevent the trap-door from revolving in the wrong direction. F designates a stud projecting from the rear of the head-board a short distance above and parallel with the frame, the end of which is the fulcrum for the pivoted lever G, to the lower end of which is pivoted the stop-latch D. H designates a cord, one end of which is fastened to the upper end of the lever G. This cord passes over a pulley arranged in the upper part of the head-board, and its lower end, to which is securely fastened the bait-hook or ring $a$, hangs a short distance above the platform. The spring $b$ serves to press the lever G back, thus keeping the stop-latch under the platform when only the usual weight is at the bait-hook. The spring $c$ performs the same function for the rear stop. $d$ designates a stud projecting from the rear of the head-board, which serves to keep the lever G in a proper position.

In using my trap, I generally take a barrel or tank about half full of water, and cut a hole in the top of the same shape as my trap, placing the same therein, and allowing the edges of my frame to rest upon the top or cover of the tank or cask. When an animal of sufficient weight to depress the platform stands upon it and pulls at the bait attached to the bait-hook $a$, the stop-latch is withdrawn, and the trap-door revolves, causing the animal to fall into the barrel or receptacle beneath, after which the platform reassumes its proper position, the next set of wings taking a horizontal situation.

What I claim as new, and desire to secure by Letters Patent, is—

In an animal-trap, the rear stop-catch E, with spring $c$, used in combination with the radially-winged revolving trap-platform, substantially as shown and described.

In testimony that I claim the above, I have hereunto subscribed my name in the presence of two witnesses.

DAVID A. LEACH.

Witnesses:
D. J. HODGES,
JAMES M. SARE.